United States Patent [19]

Halvorson et al.

[11] Patent Number: 4,961,325
[45] Date of Patent: Oct. 9, 1990

[54] HIGH PRESSURE GAS SUPPLY SYSTEM

[75] Inventors: Thomas G. Halvorson, Lockport; Herbert R. Schaub, East Amherst, both of N.Y.

[73] Assignee: Union Carbide Corporation, Danbury, Conn.

[21] Appl. No.: 404,279

[22] Filed: Sep. 7, 1989

[51] Int. Cl.⁵ .............................................. F17C 7/04
[52] U.S. Cl. ..................................... 62/48.1; 62/50.1
[58] Field of Search ....................... 62/48.1, 50.1, 50.2

[56] References Cited

U.S. PATENT DOCUMENTS

| | | | |
|---|---|---|---|
| 2,242,108 | 5/1941 | Bullowa et al. | 128/191 |
| 2,487,863 | 11/1949 | Garretson | 62/50.1 |
| 3,001,375 | 9/1961 | Tauscher | 62/51 |
| 3,012,408 | 12/1961 | Perkins et al. | 62/52 |
| 3,135,099 | 6/1964 | Holm | 62/50.2 |
| 3,241,328 | 3/1966 | Engel et al. | 62/50.2 |
| 3,302,418 | 2/1967 | Walter | 62/50.2 |
| 3,473,343 | 10/1969 | Chamberlain | 62/45 |
| 3,827,246 | 8/1974 | Moen et al. | 62/50 |
| 4,072,024 | 2/1978 | Higgins | 62/50 |
| 4,174,619 | 11/1979 | Tocha | 62/50.2 |
| 4,175,395 | 11/1979 | Prost et al. | 62/50.2 |
| 4,579,566 | 4/1985 | Brugerolle | 55/50 |
| 4,583,372 | 4/1986 | Egan et al. | 62/50.1 |
| 4,607,489 | 8/1986 | Krongold | 62/49 |
| 4,766,731 | 8/1988 | Graczyk et al. | 62/55 |

Primary Examiner—Ronald C. Capossela
Attorney, Agent, or Firm—Stanley Ktorides

[57] ABSTRACT

Method and apparatus for supplying gas, especially a cryogenic gas, to a use point at high pressure, especially supercritical pressure, with little or no lag time comprising a gas supply for quickly pressurizing a vaporizable liquid and the vaporization of the pressurized liquid for high pressure gas supply.

17 Claims, 1 Drawing Sheet

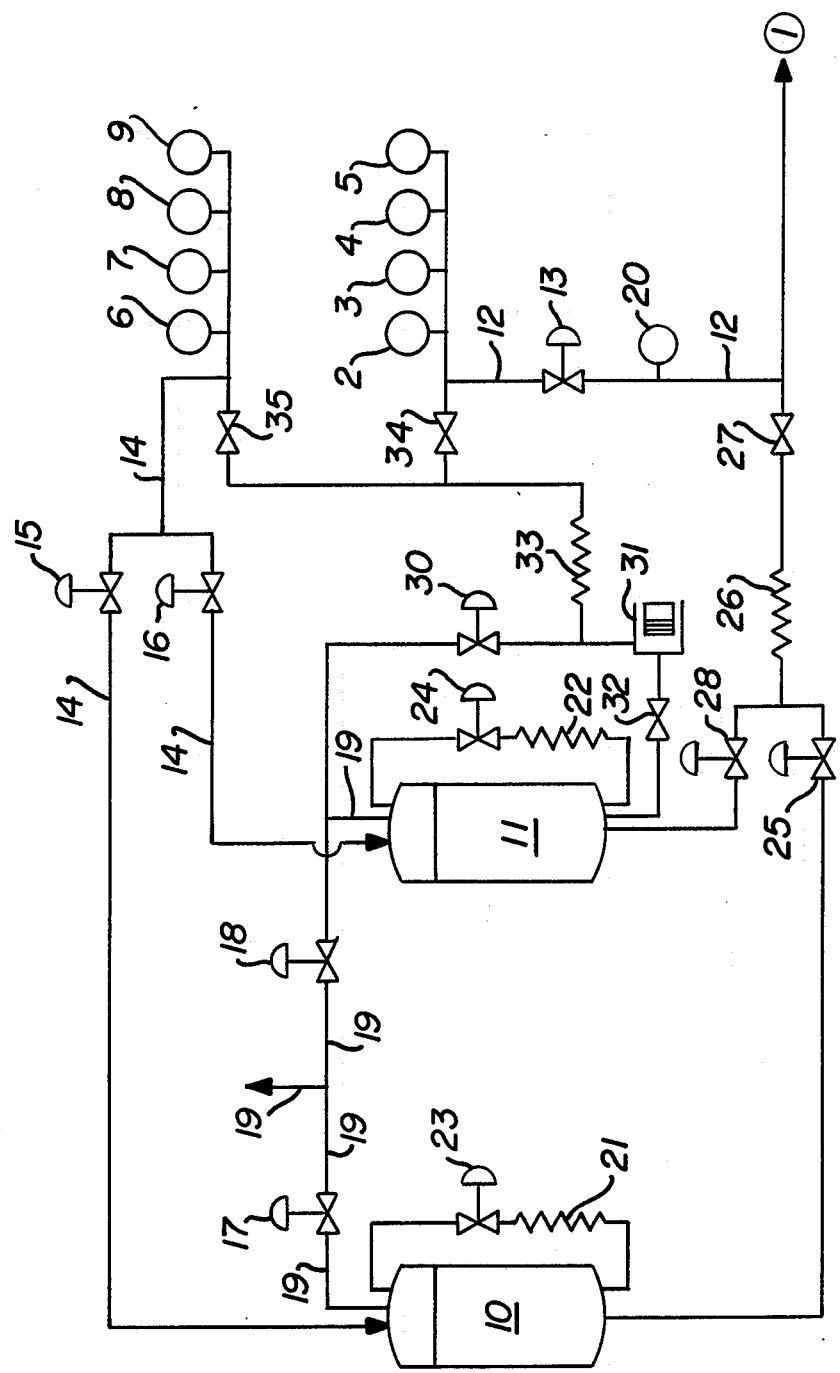

HIGH PRESSURE GAS SUPPLY SYSTEM

TECHNICAL FIELD

This invention relates generally to the field of high pressure gas supply and is particularly applicable to high pressure cryogenic gas supply.

BACKGROUND ART

A cryogenic gas, such as nitrogen, is supplied to a user from a variety of sources. If the user is a large volume user the gas is generally supplied, in the case of nitrogen, from an air separation plant. In any case, the primary gas supply system generally has a backup system to supply product gas in the event that the primary gas supply system becomes inoperative. A typical backup gas supply system comprises a low pressure liquid storage tank, a centrifugal pump to pump the liquid to the desired use pressure, and a vaporizer to convert the liquid to product gas. Another typical system utilizes a pressure building coil to pressurize the tank and thereby eliminate the pump.

In recent years there has arisen an increased need to supply cryogenic gas at pressures exceeding the critical pressure of the gas. For example, nitrogen, which has a critical pressure of 493 pounds per square inch absolute (psia), is now being used at pressures exceeding its critical pressure for molding and curing purposes in the tire industry. At such supercritical pressures, the conventional system employing a centrifugal pump is not effective because of the requirement for multiple stages and high rotational speeds.

The requirements for a supercritical pressure backup gas supply necessitate a different approach particularly if there is a power outage and the system is required to maintain product flow for a specified period of time. One approach to providing a supply of this nature is to maintain a liquid storage tank at the required supercritical operating pressure at all times. However, there are two serious problems to this approach. Both problems relate to the characteristics of supercritical fluids. When the storage pressure in a cryogenic tank exceeds the critical pressure, there are no longer two distinct fluid states—liquid and gas—which have a well-defined interface. Supercritical fluids have only a single phase which generally can be considered gaseous since it is compressible.

The first of these problems deals with tank contents gauging. Conventional methods used to determine liquid storage tank contents rely on a differential pressure measurement taken between the top and the bottom of the tank. Generally, the liquid phase density is considerably greater than the gas phase density and its saturation pressure can be determined or estimated. These differential pressure measurements can be translated into contents charts to determine the product inventory with reasonable accuracy. With supercritical pressures, differential pressure measurements cannot be directly translated into known contents. The temperature profile inside the tank is generally not known and, hence, the fluid density cannot be known. This is particularly true for tanks that sit idle for many days absorbing environmental heat leak. This uncertainty in backup product inventory reduces the reliability of the delivery system.

The second problem also relates to the lack of two phases in the storage tank at supercritical pressures. The conventional method of self-contained pressure maintenance which utilizes a density difference between the tank liquid and an external gas return circuit as the driving force for fluid flow will be ineffective.

Several methods have been proposed in order to reliably supply gas to a use point at supercritical pressure. One such method combines low pressure liquid storage with a positive displacement pump. However there are three characteristics of such systems which detract from their reliability when used with cryogenic fluids.

First, at the moment that the backup system is needed for operation, the pump is at ambient temperature and requires a period of cooldown and priming before it can operate successfully and deliver product at high pressure. This time period can often be many minutes. If the pipeline to the use point has little gas ballast, the pressure will quickly fall. Second, operation of a pumping system during backup periods requires electrical energy. During power outages that may occur, this energy must be supplied from a backup generator. Furthermore, electrical switchgear and controls must be employed increasing both the capital and operating costs. Third, cryogenic pumps require close attention to their maintenance for successful operation particularly their priming needs since they are pumping fluids whose temperatures are close to their boiling points. The requisite careful, scheduled preventive maintenance program to ensure that the pump will be operational when needed, further increases the system operating costs.

A second proposed method for reliably supplying supercritical pressure gas combines low pressure liquid storage with a multi-stage turbine pump. However, the problems associated with this system are similar to those discussed above with reference to positive displacement pumps. While the response to bringing the system on-line may be faster than that of the positive displacement pump depending upon design choices because separate insulated sumps filled with liquid cyrogen could surround the turbine pumps leaving them always cold for quick starting product losses during idle periods would be considerably greater due to the venting of liquid boil-off from the insulated sumps.

Yet a third proposed system involves a system comprising a dedicated bank of high pressure gas receivers. Backup operation can begin immediately and can last as long as the pressure in the receiver bank remains higher than the user requires. Electrical energy is not required and maintenance needs are almost eliminated. Unfortunately, this approach is practical only for short time periods, thus limiting the usefulness of this system.

A conventional pressure building coil takes a considerable time to achieve the requisite pressure and may not be operable during a power loss.

Clearly, a reliable and efficient system for providing high pressure gas to a use point is necessary and desirable.

Accordingly it is an object of this invention to provide an improved method for supplying gas to a use point at a high delivery pressure.

It is another object of this invention to provide an improved method for supplying a cryogenic gas to a use point at a high delivery pressure.

It is a further object of this invention to provide an improved method for supplying gas to a use point at a supercritical pressure.

It is yet another object of this invention to provide a gas supply system for accomplishing the above-stated objects.

SUMMARY OF THE INVENTION

The above and other objects which will become apparent to those skilled in the art upon a reading of this disclosure are attained by the present invention one aspect of which is:

A method for supplying gas to a use point at a high delivery pressure comprising:

(A) maintaining a liquid supply at a pressure less than the delivery pressure and a gas supply at a pressure at least equal to the delivery pressure;

(B) passing gas from the gas supply to the liquid supply to raise the pressure of the liquid supply to at least the delivery pressure;

(C) vaporizing liquid from the liquid supply to produce gas at a pressure at least equal to the delivery pressure; and (D) passing gas produced in step (C) to the use point at the high delivery pressure.

Another aspect of this invention is:

A gas supply system for providing gas to a use point at a high delivery pressure comprising:

(A) a liquid reservoir;

(B) a gas reservoir connected by conduit means to the liquid reservoir;

(C) means to vaporize liquid from the liquid reservoir; and (D) means to pass gas from the vaporization means to the use point.

As used herein, the term "cryogenic gas" means a gas which condenses at a temperature below 120° K. at atmospheric pressure.

As used herein, the term "supercritical pressure" means a pressure higher than the critical pressure of a fluid. The critical pressure is the saturation pressure corresponding to the critical temperature at which point a gas cannot be liquefied by compression Above the critical pressure a fluid is single phase at any temperature.

BRIEF DESCRIPTION OF THE DRAWING

The sole FIGURE is a schematic representation of one preferred embodiment of the gas supply system of this invention.

DETAILED DESCRIPTION

The invention will be described in detail with reference to the FIGURE. Referring now to the FIGURE, use point 1 is a user of high pressure gas, especially of gas at supercritical pressure. One of the many examples of such use points is the molding and curing of tires.

The gas supply system of this invention comprises a gas reservoir and a liquid reservoir. In the preferred embodiment illustrated in the FIGURE there is also employed an auxiliary gas reservoir which comprises four tanks 2, 3, 4 and 5. The gas reservoir of the invention comprises, in the illustrated embodiment, four tanks 6, 7, 8 and 9, and the liquid reservoir comprises two tanks 10 and 11. The auxiliary gas reservoir is connected by conduit means 12 through valve 13 to use point 1. The gas reservoir is connected by conduit means 14 through valves 15 and 16 to the liquid reservoir. During normal standby operation the auxiliary gas reservoir has a supply of gas maintained at a pressure at least equal to the delivery pressure which is the use pressure of the use point. The gas reservoir has a supply of gas maintained at a pressure at least equal to the delivery pressure and the liquid reservoir has a supply of liquid maintained at a pressure less than the delivery pressure. In a preferred embodiment, the delivery pressure equals or exceeds the supercritical pressure of the gas, and the liquid supply is maintained at a pressure of about ambient pressure at standby. Valves 13, 15 and 16 are closed while vent valves 17 and 18 are open to allow for the venting of boil off through conduit 19 due to environmental heat leak. By maintaining the pressure within liquid tanks 10 and 11 at about ambient, the venting losses due to evaporation will be minimized. Were the liquid tanks maintained at a significantly higher pressure, such as at the delivery pressure, the venting losses would be greater.

During normal operation the use point is supplied with high pressure gas from a main supply source, such as, for example, an air separation plant, while the supply system of this invention is operated on standby. When the main supply source can no longer deliver requisite product due to, for example, a plant malfunction or a power outage, the supply system of this invention operates as follows. As use point pressure begins to fall the pressure drop is sensed such as by pressure senser 20 which opens valve 13 thus passing gas from the auxiliary gas supply to use point 1 through conduit 12 In this preferred embodiment of the invention, product gas is supplied to the use point at the requisite delivery pressure almost instantly when the need arises. Vent valves 17 and 18 are closed and valve 15 is opened thus passing gas from the gas supply to tank 10 through conduit 14. In addition both tanks 10 and 11 now undergo pressure maintenance by a pressure maintenance system comprising the vaporization of liquid through heat exchangers 21 and 22 respectively and the passage of resulting gas back into the tanks through valves 23 and 24 respectively. These pressure maintenance systems operate to maintain the pressure inside the tanks at or above the delivery pressure.

Because of the rapid pressurization from the gas supply, the liquid supply is brought to the requisite delivery pressure much faster than would be possible by a conventional system employing a pump or a pressure building coil type system. When the requisite delivery pressure is reached by the liquid supply, valves 15 and 13 are closed and product gas is supplied from the liquid supply. This is done by opening valve 25 and vaporizing the high pressure liquid by passing it through vaporizer 26 to produce product gas at a pressure at least equal to the delivery pressure. Vaporizer 26 is preferably an atmospheric vaporizer; a particularly preferred atmospheric vaporizer is disclosed and claimed in U.S. Pat. No. 4,399,660-Vogler et al. The product gas is passed to use point 1 through check valve 27.

The requisite pressure is maintained within liquid tank 10 by the pressure maintenance system comprising heat exchanger 21 and valve 23. An appropriate pressure switch cycles valve 23 open and closed to maintain the proper pressure within tank 10. When the liquid within tank 10 has been substantially consumed, the product gas will be supplied from the liquid in tank 11 by the closing of valve 25 and the opening of valve 28. Enough liquid should remain in tank 10 to provide sufficient liquid head to cause fluid flow through vaporizer 21. The requisite pressure is maintained within tank 11 by the pressure maintenance system comprising heat exchanger 22 and valve 24 in the same way as described with tank 10. It should be noted that it is not necessary to utilize gas from the gas reservoir to pressurize tank 11 since there is sufficient time to develop the required pressure with the pressure maintenance system prior to the tank switchover. Of course tank 11 would be initially pressurized through valve 16 if it were the first tank used to supply the liquid.

The high pressure gas supply system will thus operate to continue the supply of gas to the use point at the requisite high delivery pressure until the main gas source resumes operation. The supply system of this invention can operate for an indefinite period by recharging the liquid reservoir with liquid.

Once the main gas supply is back on line the gas supply system of this invention is returned to standby. The gas reservoir and the auxiliary gas reservoir may be recharged with gas at a pressure at least equal to the delivery pressure. This is done by opening valve 30 to cool and prime small high pressure positive displacement pump 31. Thereafter valve 30 is closed and liquid is pumped through valve 32 by pump 31 through vaporizer 33 and through checkvalves 34 and 35 into the auxiliary gas reservoir and the gas reservoir respectively.

Although the high pressure gas supply system of this invention has been described in detail with reference to a single preferred embodiment, it is appreciated by those skilled in the art that there are numerous other embodiments of the invention within the spirit and scope of the claims. For example, the number of individual tanks which makeup the gas reservoir can vary from 1 to 6 or more. A separate auxiliary gas reservoir need not be employed. In another embodiment the gas reservoir may, in addition, provide the function of the auxiliary gas reservoir by providing gas directly to the use point as well as to the liquid reservoir. Any suitable number of liquid tanks, one or more, can be employed as the liquid reservoir. The liquid reservoir would generally be sized to provide at least about 24 hours of gas supply prior to the need for liquid recharging.

It is expected that the high pressure gas supply system of this invention will be most useful for supplying a cryogenic gas such as nitrogen at a pressure above its critical pressure. Other fluids which may be used with this invention include argon, oxygen, hydrogen and methane. In the practice of this invention the gas and the liquid are preferably of the same chemical composition.

Now by the use of the method and apparatus of this invention, one can reliably supply gas, especially supercritical pressure gas, virtually instantly once the main gas source goes down, without relying on electricity or on difficult to maintain pumps, and maintain this supply until the main gas source becomes fully operational again.

We claim:

1. A method for supplying gas to a use point at a high delivery pressure without the need for a pump comprising:
   (A) maintaining a liquid supply at a pressure less than the delivery pressure and a gas supply at a pressure at least equal to the delivery pressure;
   (B) passing gas from the gas supply to the liquid supply to raise the pressure of the liquid supply to at least the delivery pressure;
   (C) vaporizing liquid from the liquid supply to produce gas at a pressure a least equal to the delivery pressure; and
   (D) passing gas produced in step (C) to the use point above the critical temperature at the high delivery pressure so that the high delivery pressure does not cause any liquefaction of the gas, said gas being passed without the need for a pump, and using the gas at the use point.

2. The method of claim 1 wherein the gas is a cryogenic gas.

3. The method of claim 2 wherein the gas is nitrogen.

4. The method of claim 1 wherein the delivery pressure equals or exceeds the critical pressure of the gas.

5. The method of claim 1 wherein the pressurized liquid is vaporized by heat exchange with ambient air.

6. The method of claim 1 further comprising maintaining the pressure of the liquid supply by vaporizing some of the pressurized liquid and passing resulting gas to the liquid supply.

7. The method of claim 1 further comprising recharging the gas supply by vaporizing pressurized liquid and passing the resulting gas to said gas supply.

8. The method of claim 1 further comprising passing gas from the gas supply directly to the use point while passing gas from the gas supply to the liquid supply.

9. The method of claim 1 further comprising maintaining an auxiliary gas supply at a pressure at least equal to the delivery pressure and passing gas from the auxiliary gas supply to the use point while passing gas from the gas supply to the liquid supply.

10. A gas supply system for providing gas to a use point at a high delivery pressure without the need for a pump comprising:
    (A) a liquid reservoir;
    (B) a gas reservoir connected by conduit means to the liquid reservoir;
    (C) means to vaporize liquid from the liquid reservoir; and
    (D) means to pass gas from the vaporization means above the critical temperature to the use point without the need for a pump so that none of the gas becomes liquefied by increased pressure.

11. The gas supply system of claim 10 wherein the gas reservoir comprises a plurality of tanks.

12. The gas supply system of claim 10 wherein the liquid reservoir comprises a plurality of tanks.

13. The gas supply system of claim 10 wherein the vaporization means is an atmospheric vaporizer.

14. The gas supply system of claim 10 further comprising pressure maintenance means comprising means to pass liquid from the liquid reservoir to a vaporizer and means to pass gas from said vaporizer to the liquid reservoir.

15. The gas supply system of claim 10 further comprising gas reservoir recharging means comprising means to pump liquid from the liquid reservoir to a vaporizer and means to pass gas from said vaporizer to the gas reservoir.

16. The gas supply system of claim 10 further comprising means to pass gas from the gas reservoir to the use point.

17. The gas supply system of claim 10 further comprising an auxiliary gas reservoir and means to pass gas from the auxiliary gas reservoir to the use point.

* * * * *